(No Model.)
A. B. MONCK.
GRAIN SEPARATOR.
No. 305,528. Patented Sept. 23, 1884.
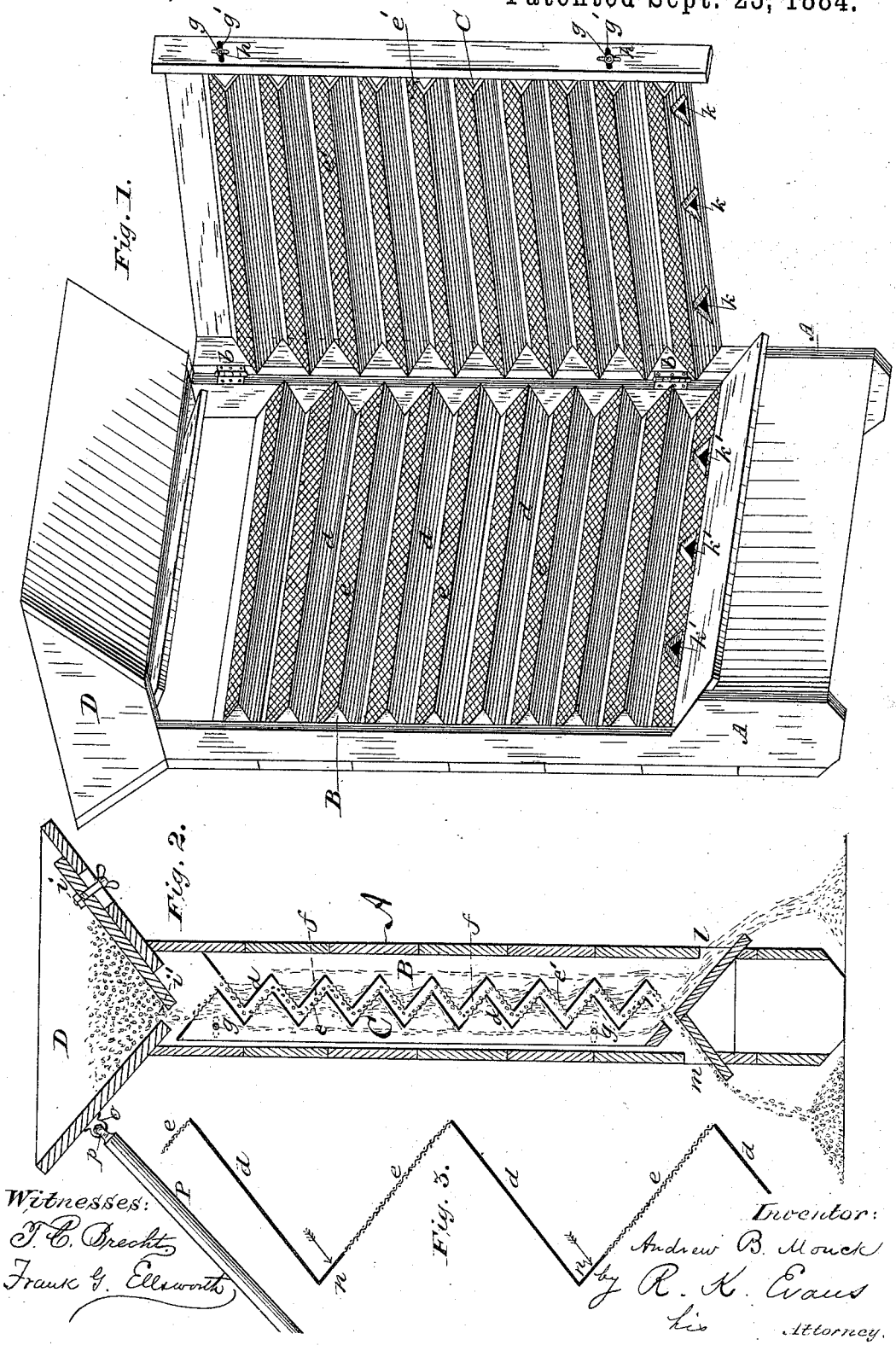
Witnesses:
T. C. Brecht
Frank G. Ellsworth
Inventor:
Andrew B. Monck
by R. K. Evans
his Attorney.

UNITED STATES PATENT OFFICE.

ANDREW B. MONCK, OF FARGO, DAKOTA TERRITORY, ASSIGNOR OF ONE-HALF TO B. CLOUTIER, OF SAME PLACE.

GRAIN-SEPARATOR.

SPECIFICATION forming part of Letters Patent No. 305,528, dated September 23, 1884.

Application filed May 9, 1884. (No model.)

*To all whom it may concern:*

Be it known that I, ANDREW B. MONCK, of Fargo, in the county of Cass and Territory of Dakota, have invented a new and Improved Grain-Separator to Remove Cockle, Small Seed, Wild Buckwheat, and like Impurities from Wheat and other Cereals; and I hereby declare the following to be a full, clear, and exact description of the same, reference being had to the accompanying drawings, making part of this specification, in which—

Figure 1 is an isometrical perspective view of the separator open to show the interior construction. Fig. 2 is a vertical cross-sectional view showing the grain passing down through the separator. Fig. 3 is an enlarged view of a section of one of the zigzag screens.

My invention relates to grain-separators; and it has for its object to successfully remove cockle, cheat, and like impurities from wheat and other cereals by gravity-screening, whereby I obtain a thorough and complete separation in a most economical manner.

My invention consists in sundry details of construction of mechanism, as is hereinafter fully described, and specifically pointed out in the claims.

In order that those skilled in the art may make and use my invention, I will proceed to describe the manner in which I have carried it out.

In the said drawings, A is the casing of the separator, one side of which is hinged at $b\ b$, so as to give ready access to the interior of the machine. Within the casing is a zigzag partition, B, made of alternate strips of imperforate material, $d$, and strips of perforated material, $e$, set at an angle to each other, as shown. Secured to the hinged side of the casing is a partition, C, similarly constructed with partition B, with the exception that the perforated portions $e'$ alternate with the perforated portions $e$, and each perforated portion $e'$ lies opposite to and parallel with an imperforate portion, $d$, of partition B, so that the protruding angles of partition C enter the included angles of partition B, a space or zigzag passage, $f$, being left between the partitions for the passage of the grain. The partition C is secured to the frame by means of rods $g$, which pass through it near the top and bottom, and the ends of which protrude through slots $g'$ in the casing, and are provided with screw-threads and nuts $h$. The slots and nuts provide for an adjustment of one screen to and from the other, so that the size of the grain-passage may be increased or diminished at will. The top of the casing is provided with a feed-hopper, D, having an adjustable slide, $i$, secured by slots and bolts, whereby the size of the feed-opening $i'$ can be made of a proper size to correspond with the size of the grain-passage. The bottom section of partition C is imperforate, but is provided with a series of passage-ways, $k\ k$, registering with like passage-ways, $k'\ k'$, in the lower perforated section of partition B, to conduct the cockle and other refuse to a proper discharge-opening, $l$, on one side of the machine or casing, while the cleaned grain passes out at the opening $m$ in the opposite side of the casing. (See Fig. 2.)

Preferably, I make the perforated sections of the partitions with a narrow strip of sheet metal, $n$, at their tops, to receive the impact of the falling grain and avoid detrimental wear on the wire-gauze.

Secured to one side of the hopper is a ring, hook, or other fastening device, $o$, to engage with a fastening device, $p$, on the end of a prop, P, provided to aid in sustaining the cleaner in a perpendicular position, so that the base need not be broadened. Thus space is economized.

Having thus described my invention, what I claim as new, and desire to secure by Letters Patent, is—

1. The main casing A, provided with the zigzag screening-partition B, in combination with the hinged portion of the casing provided with the zigzag screening-partition C, substantially as specified.

2. The zigzag screening-partition B, in combination with the zigzag screening-partition C and adjustable securing devices, whereby the partitions can be adjusted to and from each other, as set forth.

3. The zigzag screening-partitions B C, in combination with the passage-ways $k$, attached to one screening-partition, and passage-ways $k'$, attached to the other screening-partition, said ways $k$ and $k'$ registering with each other when the hinged portion is closed, all constructed substantially as set forth.

ANDREW B. MONCK.

Witnesses:
L. W. SCHRUTH,
C. P. MILLER.

Correction in Letters Patent No. 305,528.

It is hereby certified that in Letters Patent No. 305,528, granted September 23, 1884, upon the application of Andrew B. Mouck, of Fargo, Dakota Territory, for an improvement in "Grain Separators," the name of the patentee was incorrectly written and printed "Andrew B. Monck," instead of *Andrew B. Mouck;* and that the proper correction has been made in the files and records pertaining to the case in the Patent Office, and should be read in the Letters Patent to make it conform thereto.

Signed, countersigned, and sealed this 2d day of December, A. D. 1884.

[SEAL.]
M. L. JOSLYN,
*Acting Secretary of the Interior.*

Countersigned:
BENJ. BUTTERWORTH,
*Commissioner of Patents.*